United States Patent Office 2,931,235
Patented Apr. 5, 1960

2,931,235

VARIABLE SPEED FRICTION DRIVE TRANSMISSIONS

Albert John Hayward, Colchester, England, assignor to The George Cohen 600 Group Limited, London, England, a British company Application August 21, 1958, Serial No. 756,475

Claims priority, application Great Britain November 12, 1957

14 Claims. (Cl. 74—200)

This invention relates to friction drive transmission capable of transmitting drive from a driving shaft to a driven shaft at ratios infinitely variable between maximum and minimum values, and of the general kind wherein drive between coaxial driving and driven elements is transmitted by frictional contact under pressure through drive-transmitting elements rotatable on axes which are angularly displaceable, the rolling surfaces of the co-operating elements being arranged so that on angular displacement of said axes the drive ratio between the driving element and the drive-transmitting elements and between the driven element and the drive-transmitting elements is varied inversely, and mechanism being provided for effecting simultaneous adjustment of said axes.

In infinitely variable friction drive transmissions of the kind referred to, the pressures at the points of frictional contact between the co-operating elements of the transmission unit requisite for effective operation thereof are applied either by spring loading or by automatic pressure-adjusting means with initial pre-loading, and are of such high order that while adjustment for angularly displacing the axes of the intermediate drive-transmitting elements for effecting gradual change in ratio can be effected by application of a moderate force while the drive is being transmitted, serious damage to components of the transmission unit may result if excessive force is applied to overcome sliding friction at the pressure points in effecting a sudden change in ratio while the drive is being transmitted, or to overcome static friction at the pressure points in effecting adjustment of ratio while the co-operating rotatable elements of the unit are stationary.

The present invention has for its object to provide improvements in infinitely variable friction drive transmissions of the kind referred to, and particularly in control means therefor, whereby the possibility of damage to components by the application of excessive ratio-adjusting force may be obviated, and whereby any desired ratio may be preselected and brought into action as and when required.

According to the present invention, an infinitely variable friction drive transmission comprises an infinitely variable friction drive transmission unit of the kind referred to, and control means for said unit including a control member adapted to be moved manually or automatically for varying the drive ratio in said unit, and means operatively connecting said control member to said mechanism, said means incorporating a resilient pressure-limiting device acting in either direction of movement of the control member to restrict the force applied to said mechanism to an amount sufficient to effect angular displacement of the axes of the drive-transmitting elements when said unit is running, but insufficient to exert excessive stress on components of the unit against the resistance imposed by sliding or static friction at the points of frictional contact.

More specifically, the invention includes an infinitely variable friction drive transmission comprising an infinitely variable friction drive transmission unit of the kind, e.g. as disclosed in United States Patent No. 2,469,653, wherein drive at variable ratio is transmitted by coaxial driving and driven elements having friction drive rims or parts of substantially equal diameter engaging a set of intermediate drive-transmitting members in the form of spherical bodies, at least three in number, uniformly spaced circumferentially about the common axis of said elements, said friction drive rims or parts of the elements engaging the spherical bodies in axially spaced planes normal to the common axis of the rotatable elements and being retained in frictional engagement therewith by a rotatable pressure member reacting on the spherical bodies in opposition to said friction drive rims or parts of the elements in a plane substantially midway between said axially spaced planes so that the forces acting on the spherical bodies are symmetrically disposed and balanced, and the coaxial elements being pressed axially towards one another whereby drive is transmitted by frictional contact from one element through the spherical bodies reacting against the pressure member to the other element, and wherein each of the spherical bodies is rotatable on an axle projecting at each end of the respective body for slidable engagement with arcuate radially disposed guides in, or carried by, a casing enclosing the transmission, said axle also having a spherical-surfaced enlargement engaging a slot in an annular "iris" plate disposed at one side of the spherical bodies and conforming substantially to the curvature thereof, the slots in the "iris" plate being shaped so that on angular movement of the "iris" plate about the axis of the unit, the axles of the spherical bodies are tilted in unison in radial planes with respect to said driving and driven elements, thereby altering the ratio of drive from one of said elements to the other, and control means for said unit, said control means including a control member adapted to be moved manually or automatically for varying the drive ratio in said unit, and means operatively connecting said control member to said "iris" plate, said means incorporating a resilient pressure-limiting device acting in either direction of movement of the control member to restrict the force applied to said "iris" plate to an amount sufficient to displace the axes of the spherical bodies when said unit is running, but insufficient to exert excessive stress on components of the unit against the resistance imposed by sliding or static friction at the points of frictional contact.

The invention is of particular utility in connection with infinitely variable friction drive transmission units as disclosed in the copending application Serial No. 756,474, filed Aug. 21, 1958, wherein the driving and driven elements cooperating with the spherical bodies are provided on concentric shafts, an outer tubular shaft journalled in a main end part of the casing of the unit, and an inner shaft extending through the outer shaft and rotatably supported concentrically therewith independently of an opposite end part or cover plate structure of the casing so that said main end part of the casing supports the whole of the rotatable assembly of the transmission unit, said elements being pressed axially towards one another by the action of automatic pressure-adjusting means arranged so that torsional stress dependent on the load transmitted imparts proportional axial thrust acting to press the driving and driven elements towards one another, the opposite axial thrust forces on the said elements being resolved in the concentric shaft assembly so that the casing is not stressed thereby.

In its specific application to an infinitely variable friction drive transmission unit as disclosed in said copending application, the present invention includes the combination of an infinitely variable friction drive transmission unit comprising coaxial driving and driven elements provided on concentric outer and inner shafts to engage at their peripheries a circumferentially spaced set of spherical bodies disposed between peripheral friction drive rims or parts of the elements and an outer retaining ring, the outer shaft being tubular and the inner shaft extending therethrough, a casing enclosing the co-operating elements of the transmission including a main end part and an opposite cover plate structure, the said main end part supporting the whole rotatable assembly of the transmission unit, the outer tubular shaft being journalled in bearings in the main part of the casing and being integrally, or otherwise fixedly, provided at its inner end with one of said elements, and the inner shaft extending concentrically through the tubular outer shaft being supported concentrically therewith independently of the cover plate structure of the casing and carrying the other of said coaxial elements so mounted as to be rotatable and axially displaceable with respect to said inner shaft, drive between the inner shaft and the element mounted thereon being transmitted by automatic pressure-adjusting means disposed between an abutment on the inner shaft and the respective element, said pressure-adjusting means being adapted to convert torsional stress into axial thrust so that when drive is being transmitted the coaxial elements are pressed axially towards each other, and a thrust bearing being provided between the inner and outer shafts whereby axial pressure exerted by the automatic pressure-adjusting means reacts through the concentric shafts on said elements and through the spherical bodies without stressing the casing, and control means for said unit, said control means including a control member adapted to be moved manually or automatically for varying the drive ratio in said unit, and means operatively connecting said control member to said "iris" plate, said last-mentioned means incorporating a resilient pressure-limiting device acting in either direction of movement of the control member to restrict the force applied to said "iris" plate to an amount sufficient to displace the axes of the spherical bodies when said unit is running, but insufficient to exert excessive stress on components of the unit against the resistance imposed by sliding or static friction at the points of frictional contact.

In one embodiment, the resilient pressure-limiting device of the control means may comprise a torsion bar connected between the control member and the ratio-adjusting mechanism of the transmission unit, the torsion bar possessing such degree of torsional resilience that the control member may be moved to any extent within its range of movement corresponding to the range of movement of the ratio-adjusting mechanism without transmitting excessive force thereto. In the application of the invention to a transmission unit as disclosed in the said copending application wherein the "iris" plate is mounted on a spindle or member extending through an axial bore in a cover plate structure of the casing of the transmission unit, the pressure-limiting device of the control means comprises a torsion bar connected to said spindle or member to extend axially therefrom for connection at its other end to a remotely disposed coaxial, or substantially coaxial, control member.

In a further embodiment, the pressure-limiting device of the control means may comprise a spring and cam device arranged so that, on movement of the control member in either direction when resistance is imposed by sliding or static friction at the pressure points, a spring or spring unit of said device is stressed by the action of a cam thereof, while, on rotation of the rotatable elements of said transmission unit to relieve the resistance, the energy stored in the spring or spring unit reacts on the cam to cause the ratio-adjusting mechanism to follow the movement of the control member. In the application of invention to a transmission unit, as disclosed in the copending application wherein the "iris" plate is mounted on a spindle or member extending through an axial bore in a cover plate structure of the casing of the transmission unit, the cam and spring device may comprise an assemblage mounted on said spindle or member of the "iris" plate and including a lever unit, mounted so as to be rotatable and axially displaceable on an axially extending stem portion fixed to said spindle or member, said unit carrying rollers at diametrically opposite positions arranged to coact with oppositely sloping face cams on an operating member integral with, or fixed to, said spindle or member of the "iris" plate, and a spring disposed around said stem portion between said lever unit and an abutment on said stem portion, the arrangement being such that movement of a control member connected to the lever unit in either direction against resistance imposed by sliding or static friction at the pressure points between the co-operating elements causes said rollers to ride up the sloping face cams and displace the lever unit axially, thereby compressing the spring which, when the rotatable elements of the transmission unit rotate to relieve the resistance, reacts through the rollers on the face cams to effect corresponding angular movement of the spindle or member of the "iris" plate.

Means may be provided for positioning the control member for selecting a desired drive ratio. For example, the control member may be provided with a spring-loaded catch member engaging a toothed member, such as a disc or quadrant.

For automatic control of the drive ratio in response to variations in operating conditions of a machine or plant with which the drive transmission is associated, said toothed member may be angularly movable or rotatable about an axis and adapted to be operated by any suitable means so that the drive ratio is varied according to said operational variations, in which case means may be provided for locking the toothed member against angular movement or rotation when automatic control is not required.

According to a further feature of the invention, releasable means may be provided for locking the ratio-adjusting mechanism or operating member thereof against angular movement so that, while the rotatable elements of the transmission unit are rotating, the control member may be moved to select a predetermined drive ratio which is automatically taken up when said releasable means is disengaged. Said releasable means may comprise a spring-loaded catch member engageable with a toothed rim or the like on said operating member and adapted to be retained in a withdrawn position when preselection of ratio during operation of the drive unit is not required.

The invention includes the combination with a machine, particularly a machine tool such as a lathe, of an infinitely variable friction drive transmission unit and control means therefor as hereinbefore defined.

The invention is hereinafter described, by way of example, with reference to the accompanying diagrammatic drawings, in which.

Figure 1:
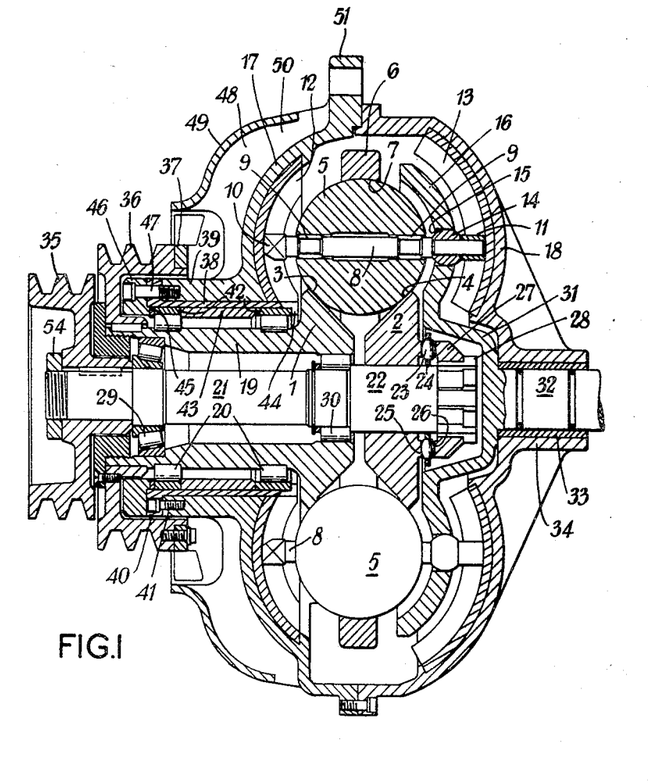
Fig. 1 is a longitudinal section illustrating one embodiment of friction drive transmission unit to which the improved control means according to the invention is applicable.
Figure 2:
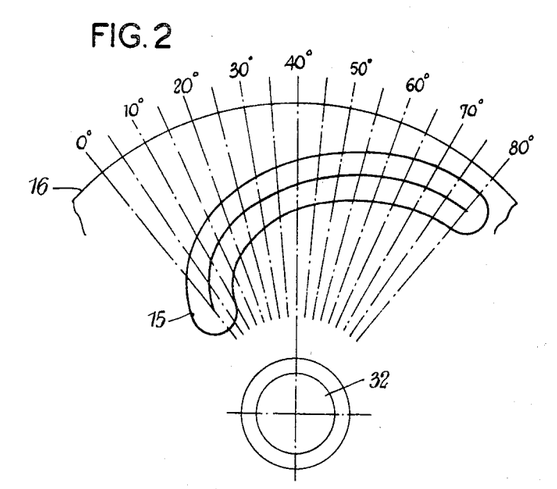
Fig. 2 is a detail view showing the approximate cam formation of the slots in the "iris" plate for obtaining variation in speed in geometrical progression in relation to angular movement of the "iris" plate.
Figure 3:
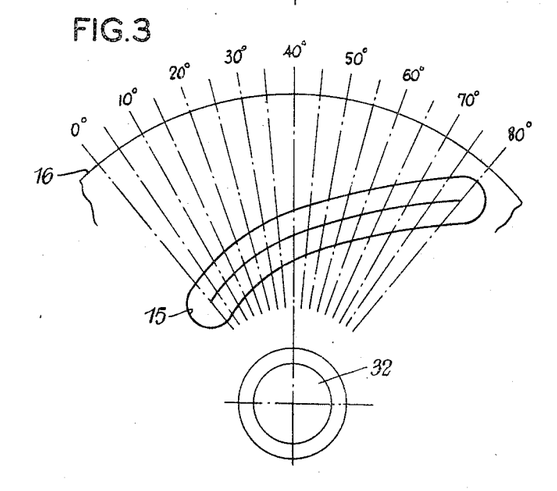
Fig. 3 is a detail view showing the approximate cam formation of the slots in the "iris" plate to obtain variation in speed in hyperbolic progression relative to angular movement of the "iris" plate.

Figs. 1, 2 and 3 of the accompanying diagrammatic drawings show a friction drive transmission unit according to the co-pending application Serial No. 756,474, filed August 21, 1958, which comprises coaxial elements 1, 2, one of which is the driving element and the other the driven element, said elements having peripheral friction drive rims 3, 4 respectively, which are spaced apart axially and engaged by spherical bodies 5, at least three and preferably five in number, which are uniformly spaced circumferentially of the friction drive rims 3, 4 and are retained in engagement therewith by an outer freely rotatable ring 6, the inner surface 7 of which conforms to the curvature of the spherical bodies 5.

The term "spherical body" used herein means a body in which the surfaces which contact the friction drive rims or parts of the driving and driven elements and the pressure member, e.g. the outer retaining ring, throughout the range of inclination of the axle of the body under the control of the "iris" plate, are portions of a sphere.

Each of the spherical bodies 5 is rotatable on an axle 8 journalled in bearings 9 in the spherical body 5, the axle 8 having at one projecting end a flat-faced head 10 and at the other projecting end a flat-faced collar 11 engaging respectively with arcuate radially disposed guides 12, 13 in opposite walls of a casing enclosing the co-operating elements. A spherical-surfaced enlargement 14, in the form of a collar on a projecting portion of the axle 8, engages in a slot 15 in an "iris" plate 16, the slot 15 being so shaped that on angular movement of the "iris" plate 16 about the axis of the unit, the axles 8 are tilted in unison in radial planes with respect to the elements 1, 2 about the axes of the respective spherical bodies 5 to vary the ratio of drive between the elements 1 and 2. The slotted portion of the "iris" plate 16, which is disposed at one side of the spherical bodies 5, conforms substantially to the curvature thereof.

In the known constructions of friction drive transmission units of the kind referred to, the elements 1, 2 are mounted on coaxial shafts journalled in bearings at opposite ends of the casing and projecting therefrom. In a modification, the elements 1, 2 are carried by concentric shafts, i.e., an outer tubular shaft and an inner shaft extending therethrough, but in this case also the shafts are journalled in bearings at opposite ends of the casing, and in order to achieve the precise axial alignment of the rotating parts which is essential for effective operation, and to avoid undue stresses on the bearings and on the casing, very precise machining of the parts of the casing is required and the casing structure as a whole has to be of relatively heavy construction. Furthermore, the "iris" plate has to be rotatably mounted at its periphery within the casing with the attendant disadvantage that the "iris" plate has to be operated by means of a lever projecting through a slot in the periphery of the casing which is difficult to render oil-tight, or has to be operated by a worm drive arrangement which is unsuitable for sensitive control of the "iris" plate by control means such as hereinafter described. It is also known to arrange a thrust bearing so that oppositely acting axial thrust forces on the shafts are not transmitted to the casing.

In the embodiment shown, the casing enclosing the co-operating elements of the transmission includes a main end part 17 and an opposite cover plate structure 18, the main end part 17 supporting the whole of the rotatable assembly of the transmission. The element 1 is integrally, or otherwise fixedly, provided on an outer tubular shaft 19 which is journalled in bearings, preferably roller bearings 20, in the main end part 17 of the casing. The other element 2 is mounted on a portion 22 of an inner shaft 21 which extends concentrically through the tubular shaft 19. The element 2 is rotatably and axially slidable on the shaft portion 22 and drive between the shaft 21 and the element 2 is transmitted by automatic pressure-adjusting means of the cam and roller type comprising, for example, a number of radially disposed barrel-shaped rollers 23 located in an apertured ring 24 and engaging oppositely disposed cam faces 25, 26 respectively, on the outer face of the element 2 and the inner face of an abutment 27 in the form of a collar keyed to the end of the shaft 21 and abutting a head portion 28 thereof. The automatic pressure-adjusting means acts in such manner that on relative rotation between the element 2 and the shaft 21, engagement of the rollers 23 between the cam faces 25, 26 converts torsional stress into axial thrust on the element 2 in a direction towards the element 1, the thrust exerted varying in proportion to the load. Apart from combined rotary and axial movement of the element 2 with respect to the shaft 21 consequent on the operation of the cam and roller pressure-adjusting device, it has been found in practice that when the transmission unit is under heavy load, appreciable distortion of the retaining ring 6 from a true circular form is liable to occur and this results in further axial displacement of the element 2 on the shaft portion 22 consequent on the axial thrust maintained by the cam shaft 21 concentrically within the shaft 19. Alternatively, a bearing assembly comprising a journal bearing and roller device. Thus, the element 2 is not fixed in relation to the shaft 21 but has a fully floating action within the limits prescribed by the function of the cam and roller device and the degree of resilience of the retaining ring 6, and changes its position on the shaft 21 in response to any variation in load.

A thrust bearing 29 is provided between the shaft 19 and the shaft 21 so that, for any given axial thrust on the element 2 in a direction towards the element 1, equal opposite thrust reaction on the abutment 27 is transmitted through the shaft 21, thrust bearing 29 and shaft 19 to the element 1. Thus, the pressure-adjusting means has the effect of applying equal and opposite axial thrust forces on the elements 1, 2 in a direction towards one another, whereby the friction drive rims 3, 4 are caused to frictionally engage the spherical bodies 5 with balanced pressures reacting against the freely rotatable retaining ring 6 to give effective transmission of power at all ratios determined by angular adjustment of the "iris" plate.

The thrust bearing 29 preferably is of the taper roller type having tubular rollers to obviate oil-pumping action, and disposed adjacent the outer end of the shaft 19 so as to serve also for journalling the outer end of the and a thrust bearing may be used in a similar manner. The shaft 21 also may be journalled within the inner end of the shaft 19 by means of a roller bearing 30, but this bearing 30 is not essential. Owing to the symmetrical distribution of the pressures acting on the spherical bodies 5, the latter, reacting in conjunction with the retaining ring 6 against the friction drive rims 3, 4, have a self-centering action on the element 2, whereby the inner end of the shaft 21 will be maintained concentric with the shaft 19.

Inasmuch as the concentric shafts 19, 21 are supported solely by the main end part 17 of the casing, the "iris" plate 16 may extend from a hollow central portion 31 mounted on a spindle or member 32 coaxial with the shaft 21 and journalled in a bearing sleeve 33 in a boss 34 of the cover plate structure 18 to extend therethrough for connection of control means to be hereinafter described.

The inner shaft 21 may be fitted at its outer end with a pulley 35 of V belt or other suitable type, and the shaft 19 similarly may be fitted with a pulley 36, the pulleys 35, 36 being keyed to the respective shafts 21 and 19 and retained in conventional manner. The pulley 36 may comprise a bladed fan structure 37 for creating cooling air currents over the main end part 17 of the casing.

The two parts of the casing may be constructed of sheet metal pressings, or, as shown, of die castings of light metal, such as aluminum or alloy thereof. A die cast main part may be combined with a cover plate structure formed as a pressing. For receiving the bearings 20 journalling the shaft 19, a cylindrical sleeve insert 38 may be inserted in an axial bore in a boss 39 on the main end part 17 of the casing, the sleeve insert 38 having at its outer end a flange 40 whereby it may be secured in the boss 39 by means such as screws 41. Outer races 42 of the bearings 20 and an intermediate spacer sleeve 43 may be positioned between an abutment 44 at the inner end of the sleeve insert 38 and a ring 45, by means of an outer ring 46 abutting the flange 40 of the sleeve insert 38 and secured in position by means of screws 47.

The main end part 17 of the casing may be provided with fins 48 and an outer wall 49 adapted to provide substantially radial or spirally extending air ducts 50 for directing air flow from the fan structure 37 over the main end part 17 of the casing.

The arcuate radially disposed guides 12, 13 also may be provided as inserts in the die castings, the inserts being of any suitable metal or material possessing the requisite strength and/or resistance to wear. Instead of using inserts, the guides 12, 13 may be provided by slots in the die castings having the wearing surfaces hardened in any suitable manner.

The casing may be provided at the top with means, such as a lug 51, by which the unit may be mounted so as to be capable of angular adjustment for drive-tensioning purposes.

In assembling the parts the nut 54 on the outer end of the shaft 21 is adjusted to displace the pulley 35 and the inner race of the thrust bearing 29 on the shaft so that the friction drive rims 3, 4 of the elements 1, 2 engage the spherical bodies with a suitable degree of preload to ensure operation of the automatic pressure-adjusting means. On slacking off the nut 54, the element 2 may be displaced axially away from the element 1 to facilitate removal or replacement of the retaining ring 6 and/or the spherical bodies 5.

In infinitely variable friction drive transmissions of the general kind referred to, and in particular transmission units wherein drive between coaxial driving and driven elements is transmitted by spherical bodies arranged and operating in the manner described to transmit drive at variable ratio, the operating pressure at the points of frictional contact between the rotatable elements of the transmission unit is of necessity considerable. Changes in ratio while the unit is operating require the application of only small force to the "iris" plate or ratio-adjusting mechanism, the change in ratio being effected by rolling contact on spiral paths between the spherical bodies or drive-transmitting elements and the driving and driven elements. If an attempt is made to change the ratio while the rotatable elements are stationary, or even to effect a large and sudden change of ratio while the elements are rotating, static or sliding friction between the elements has to be overcome and this requires the application of such force to the "iris" plate or ratio-adjusting mechanism that serious damage to components of the unit may result. It is therefore desirable that control means for the unit should be adapted to safeguard against possible application of such excessive force to the "iris" plate or ratio-adjusting mechanism.

According to the present invention, control means for operating the "iris" plate or ratio-adjusting mechanism of an infinitely variable friction drive transmission unit such as above described, comprises a control member adapted to be moved manually or automatically for varying the drive ratio in said unit and means operatively connecting said control member to the "iris" plate or ratio-adjusting mechanism, said means incorporating a resilient pressure-limiting device acting in either direction of movement of the control member to restrict the force applied to said "iris" plate or ratio-adjusting mechanism to an amount sufficient to effect angular displacement of the axes of the spherical bodies or drive-transmitting elements when said unit is running, but insufficient to exert excessive stresses on components of the unit against the resistance imposed by sliding or static friction at the points of frictional contact.

Figure 4:
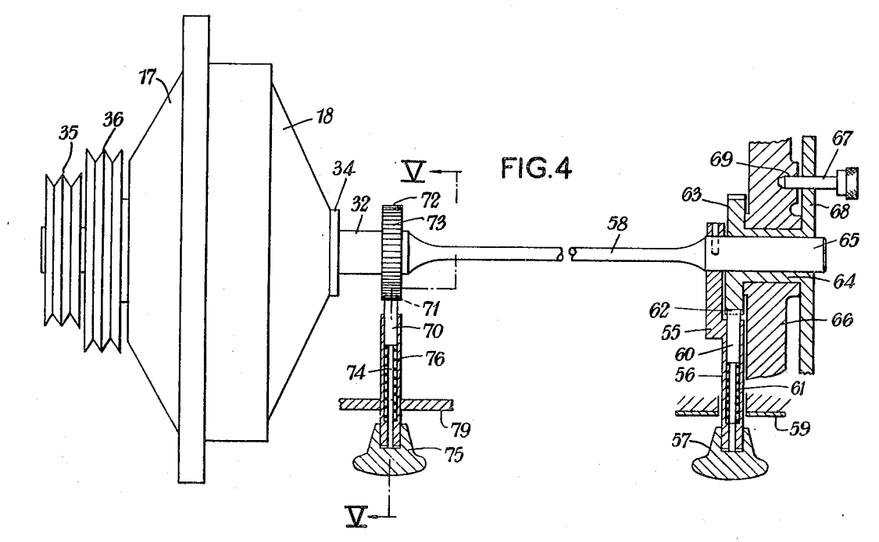
Fig. 4 is a view in elevation, partly in axial section, showing one embodiment of control means according to the invention, adapted for use in conjunction with a drive transmission unit as shown in Figs. 1 to 3.

In one embodiment, as illustrated in Fig. 4, of the accompanying diagrammatic drawings, a control member 55 having a lever arm 56 provided with a knob 57 or the like for manual operation, is connected to one end of a torsion bar 58, the other end of which is connected to the spindle or member 32 carrying the "iris" plate of the drive transmission unit. The intermediate part of the torsion bar 58 is of such length and cross-section as to have such degree of torsional resilience that the control member 55 may be moved to any extent within its range of movement without transmitting excessive force to the "iris" plate. The range of movement of the lever arm 56 corresponds to the range of angular movement of the spindle or member 32 and may be indicated by a suitable scale on a slotted arcuate plate 59. Means may be provided for positioning the control member 55 for selecting a desired drive ratio. Thus, the control member may be provided with a catch member 60 resiliently loaded by means, such as a spring 61, and having a wedge-shaped end portion 62 engaging a toothed member 63. The toothed member 63 may be mounted on a sleeve 64 in which an end portion 65 of the torsion bar 58 is journalled, the sleeve 64 being rotatably mounted in a support 66 and being normally locked against rotation or angular movement about its axis by means of a locking pin 67 inserted through a hole in a disc or wheel 68 fixed to the sleeve 64 and engaging a hole 69 in the support 66.

It will be understood that with the pin 67 in the position shown in the drawing, the lever arm 56, when angularly displaced from one position to another, will be retained in the selected position by the engagement of the wedge-shaped end portion 62 of the catch member 60 with the toothed member 63. If the drive unit is not in operation, the static friction at the points of frictional contact between the rotatable elements will prevent angular movement of the spindle or member 32 so that the torsion bar 58 will be stressed torsionally in one direction or the other. As soon as the rotatable elements of the transmission unit commence to rotate, the torsional force exerted by the torsion bar 58 on the spindle or member 32 will act to displace the "iris" plate angularly to an extent corresponding to the amount by which the control lever arm 56 has been angularly displaced. If the transmission unit is operating when the lever arm 56 is moved, the "iris" plate will follow the movement of the lever arm 56 without twisting the torsion bar 58. If the pin 67 is removed, the lever arm 56 is freely movable for varying the drive ratio in any desired manner.

If automatic control of the drive ratio is required in response to operational variations of the machine or plant with which the drive unit is associated, the disc or wheel 68 may be geared or otherwise connected to an element or device movable in response to such operational variations.

Figure 5:
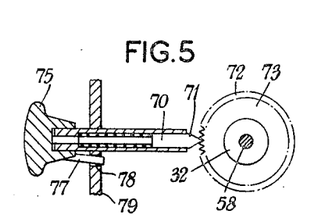
Fig. 5 is a detail cross-section on the line V—V, Fig. 4.

When the transmission unit is operating, it may be desirable to be able to pre-select a predetermined change in ratio to be brought into operation as or when required. For this purpose, releasable means is provided for locking the "iris" plate or ratio-adjusting mechanism or operating member thereof against angular movement. For example, as shown, a spring-pressed plunger 70 having a wedge-shaped portion 71 engaging a toothed rim 72 of an operating member 73 fixed to the spindle or member 32 may have a stem portion 74 provided with a knob 75 or the like whereby it may be withdrawn against the action of a spring 76 so as to be disengaged from the toothed rim 72, the knob 75 having a suitable projection 77 (Fig. 5) which in the engaged position of the plunger is accommodated in a hole 78 in a plate 79 and, by turning movement of the knob 75 when withdrawn, can be positioned to abut the face of the plate 79 so as to retain the plunger 70 in the withdrawn position. Assuming that the drive transmission unit is operating, engagement of the end portion 71 of the plunger 70 with the toothed rim 72 of the member 73 will retain the "iris" plate in the position corresponding to the drive ratio in use. A different drive ratio then may be pre-selected by suitable angular adjustment of the lever arm 56 to a pre-selected position in which it is held by engagement of the end portion 62 of the catch member 60 with the toothed member 63 which is locked by the pin 67. The torsion bar 58 is thereby stressed torsionally in one direction or the other, and when change to the pre-selected ratio is required, it is only necessary to withdraw the plunger 70 by means of the knob 75.

Figure 6:
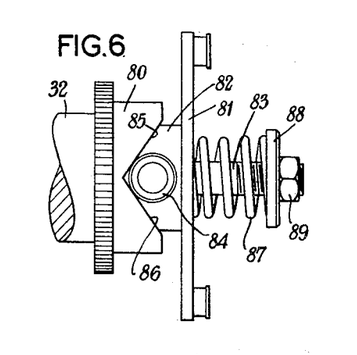
Fig. 6 is a detail side elevation, on an enlarged scale, illustrating a further embodiment of control means according to the invention.
Figure 7:
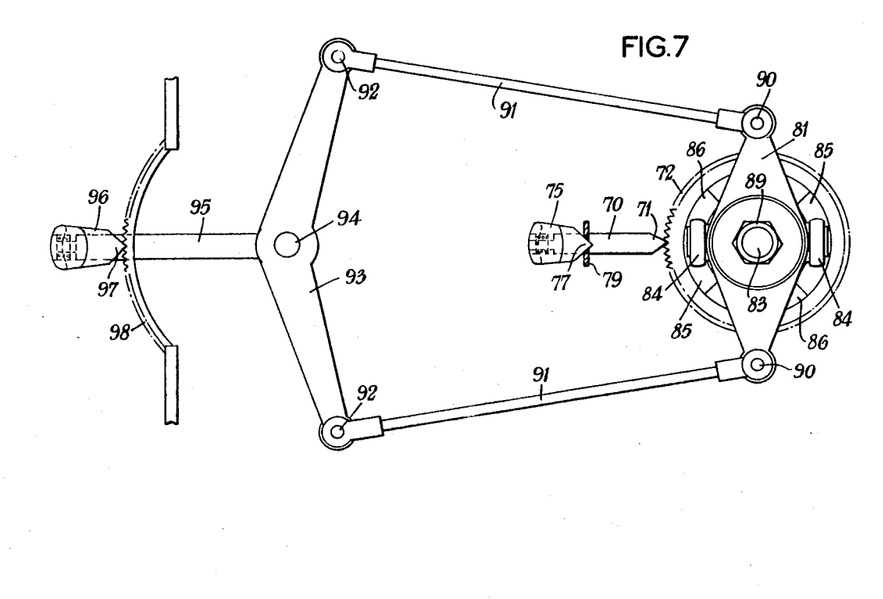
Fig. 7 is an end view of the mechanism shown in Fig. 6 and illustrating a preferred arangement of control member in connection with said mechanism.

In the modification as illustrated in Figs. 6 and 7, the resilient pressure-limiting device comprises a spring and cam arrangement. The spindle or member 32 carrying the "iris" plate is provided with an operating member 80 which may have a toothed rim 72 engageable by the wedge-shaped end portion 71 of a retractable spring-pressed plunger 70, as in the arrangement shown in Figs. 4 and 5. A lever unit 81 having a boss 82 is rotatable and axially displaceable on a stem portion 83 extending axially from the operating member 80. The boss 82 carries rollers 84 at diametrically opposite positions arranged to coact with oppositely sloping face cams 85, 86 on the member 80. A spring 87 is disposed around the stem portion 83 between the lever unit 81 and an abutment 88 adjustable by means of a nut 89 on a threaded end part of the stem portion 83. As shown in Fig. 7, the lever unit 81 may be double-armed and adapted for pivotal connection at 90 to ends of connecting rods 91, the other ends of which rods are pivotally connected at 92 to a double-armed lever 93 pivoted at 94 and provided with a hand lever arm 95 having a spring-loaded catch member 96 having a wedge-shaped end portion 97 coacting with a toothed segment 98. It will be seen that the lever 93 has arms of greater radius than the lever unit 81 so that a greater range of angular movement of the lever unit 81 and the spindle or member 32 carrying the "iris" plate may be obtained with a limited arc of travel of the operating lever arm 95.

It will be understood that the invention is not limited to the particular embodiments hereinbefore described. For example, the improved control means according to the invention is applicable to any infinitely variable friction drive transmission unit of the general kind referred to in which the drive-transmitting elements are in the form of spherical bodies, as shown in the drawings, or in which the drive-transmitting elements are in the form of discs engaging oppositely disposed concave surfaces of driving and driven elements and angularly adjustable for varying drive ratio. Furthermore, the control means may be of any other suitable form of construction. Thus, it may embody any suitable mechanical arrangement embodying lost motion in either direction from a neutral point against the action of spring or other resilient means. Particularly for remote control, the control means may comprise hydraulic transmission embodying a spring-loaded accumulator or accumulators arranged to limit the pressure which can be transmitted and to provide for storing energy sufficient to effect adjustment of the "iris" plate or ratio-adjusting mechanism when the drive unit is operating. The control means also may embody any suitable electrical transmission between the control member and the ratio-adjusting mechanism, for example, incorporating a stepping switch arrangement utilizing a solenoid or other electric motor of suitably limited power for effecting movement of the ratio-adjusting mechanism.

I claim:

1. In an infinitely variable friction drive transmission comprising an infinitely variable friction drive transmission unit of the kind wherein drive between coaxial driving and driven elements is transmitted by frictional contact under pressure through drive-transmitting elements rotatable on axes which are angularly displaceable, the rolling surfaces of the co-operating elements being arranged so that on angular displacement of said axes the drive ratio between the driving element and the drive-transmitting elements and between the driven element and the drive-transmitting elements is varied inversely, and mechanism being provided for effecting simultaneous adjustment of said axes, and control means for said unit including a control member adapted to be moved for varying the drive ratio in said unit, and means operatively connecting said control member to said mechanism, said connecting means incorporating a resilient pressure-limiting device acting in either direction of movement of the control member to restrict the force applied to said mechanism to an amount sufficient to effect angular displacement of the axes of the drive-transmitting elements when said unit is running, but insufficient to exert excessive stress on components of the unit against the resistance imposed by sliding or static friction at the points of frictional contact.

2. An infinitely variable friction drive transmission comprising an infinitely variable friction drive transmission unit of the kind wherein drive at variable ratio is transmitted to coaxial driving and driven elements having friction drive parts of equal diameter engaging a set of intermediate drive-transmitting members in the form of spherical bodies, at least three in number, uniformly spaced circumferentially about the common axis of said elements, said friction drive parts of the elements engaging the spherical bodies in axially spaced planes normal to the common axis of the rotatable elements and being retained in frictional engagement therewith by a rotatable pressure member reacting on the spherical bodies in opposition to pressure exerted by said friction drive parts of the elements in a plane midway between said axially spaced planes so that the forces acting on the spherical bodies are symmetrically disposed and balanced, and the coaxial elements being pressed axially towards one another whereby drive is transmitted by frictional contact from one element through the spherical bodies reacting against the pressure member to the other element, and wherein each of the spherical bodies is rotatable on an axle projecting at each end of the respective body for slidable engagement with arcuate radially disposed guides associated with a casing enclosing the transmission, said axle also having a spherical-surfaced enlargement engaging a slot in an annular "iris" plate disposed at one side of the spherical bodies and conforming substantially to the curvature thereof, the slots in the "iris" plate being shaped so that on angular movement of the "iris" plate about the axis of the unit the axles of the spherical bodies are tilted in unison in radial planes with respect to said driving and driven elements thereby altering the ratio of drive from one of said elements to the other, and control means for said unit, said control means including a control member adapted to be moved manually or automatically for varying the drive ratio in said unit, and means operatively connecting said control member to said "iris" plate, said connecting means incorporating a resilient pressure-limiting device acting in either direction of movement of the control member to restrict the force applied to said "iris" plate to an amount sufficient to displace the axes of the spherical bodies when said unit is running, but insufficient to exert execessive stress on components of the unit against the resistance imposed by sliding or static friction at the points of frictional contact.

3. An infinitely variable friction drive transmission according to claim 2, wherein the driving and driven elements cooperating with the spherical bodies are provided on two concentric shafts consisting of an outer tubular shaft journalled in a main end part of the casing of the unit and an inner shaft extending through the outer shaft and rotatably supported concentrically therewith independently of an opposite cover plate structure of the casing so that said main end part of the casing supports the whole of the rotatable assembly of the transmission unit, said elements being pressed axially towards one another by the action of automatic pressure-adjusting means arranged so that torsional stress dependent on the load transmitted imparts proportional axial thrust acting to press the driving and driven elements towards one another, the opposite axial thrust forces on the said elements being resolved in the concentric shaft assembly so that the casing is not stressed thereby.

4. An infinitely variable friction drive transmission, including in combination an infinitely variable friction drive transmission unit comprising coaxial driving and driven elements provided on concentric outer and inner shafts to engage at their peripheries a circumferentially spaced set of spherical bodies disposed between peripheral friction drive parts of the elements and an outer retaining ring, the outer shaft being tubular and the inner shaft extending therethrough, a casing enclosing the cooperating elements of the transmission including a main end part and an opposite cover plate structure, the said main end part supporting the whole rotatable assembly of the transmission unit, the outer tubular shaft being journalled in bearings in the main part of the casing and being fixedly provided at its inner end with one of said elements, and the inner shaft extending concentrically through the tubular outer shaft being supported concentrically therewith independently of the cover plate structure of the casing and carrying the other of said coaxial elements so mounted as to be rotatable and axially displaceable with respect to said inner shaft, drive between the inner shaft and the element mounted thereon being transmitted by automatic pressure-adjusting means disposed between an abutment on the inner shaft and the respective element, said pressure-adjusting means being adapted to convert torsional stress into axial thrust so that when drive is being transmitted the coaxial elements are pressed axially towards each other whereby drive is transmitted by frictional contact from one element through the spherical bodies reacting against the retaining ring to the other element, and wherein each of the spherical bodies is rotatable on an axle projecting at each end of the respective body for slidable engagement with arcuate radially disposed guides associated with said casing, said axle also having a spherical-surfaced enlargement engaging a slot in an annular "iris" plate disposed at one side of the spherical bodies and conforming substantially to the curvature thereof, the slots in the "iris" plate being shaped so that on angular movement of the "iris" plate about the axis of the unit, the axles of the spherical bodies are tilted in unison in radial planes with respect to said driving and driven elements, thereby altering the ratio of drive from one of said elements to the other, and a thrust bearing being provided between the inner and outer shafts whereby axial pressure exerted by the automatic pressure-adjusting means reacts through the concentric shafts on said elements and through the spherical bodies without stressing the casing, and control means for said unit, said control means including a control member adapted to be moved for varying the drive ratio in said unit, and means operatively connecting said control member to said "iris" plate, said connecting means incorporating a resilient pressure-limiting device acting in either direction of movement of the control member to restrict the force applied to said "iris" plate to an amount sufficient to displace the axes of the spherical bodies when said unit is running, but insufficient to exert excessive stress on components of the unit against the resistance imposed by sliding or static friction at the points of frictional contact.

5. An infinitely variable friction drive transmission according to claim 1, wherein the resilient pressure-limiting device of the control means comprises a torsion bar connected between the control member and the ratio-adjusting mechanism of the transmission unit, the torsion bar possessing such degree of torsional resilience that the control member may be moved to any extent within its range of movement corresponding to the range of movement of the ratio-adjusting mechanism without transmitting excessive force thereto.

6. An infinitely variable friction drive transmission according to claim 2, wherein the "iris" plate is mounted on a spindle member extending through an axial bore in the cover plate structure of the casing, and the pressure-limiting device of the control means comprises a torsion bar connected to said spindle member carrying the "iris" plate to extend axially therefrom for connection at its other end to a remotely disposed substantially coaxial control member.

7. An infinitely variable friction drive transmission according to claim 1, wherein the pressure-limiting device of the control means comprises a spring and cam device arranged so that, on movement of the control member in either direction when resistance is imposed by sliding or static friction at the pressure points, a spring component of said device is stressed by the action of a cam thereof, while, on rotation of the rotatable elements of said transmission unit to relieve the resistance, energy stored in the spring component reacts on the cam to cause the ratio-adjusting mechanism to follow the movement of the control member.

8. An infinitely variable friction drive transmission according to claim 2, wherein the "iris" plate is mounted on a spindle member extending through an axial bore in the cover plate structure of the casing, and the resilient pressure-limiting device of the control means comprises an assemblage mounted on said spindle member of the "iris" plate and including a lever unit, mounted so as to be rotatable and axially displaceable on an axially extending stem portion fixed to said spindle member, said unit carrying rollers at diametrically opposite positions arranged to coact with oppositely sloping face cams on an operating member associated with said spindle member, and a spring disposed around said stem portion between said lever unit and an abutment on said stem portion, the arrangement being such that movement of a control member connected to the lever unit in either direction against resistance imposed by sliding or static friction at the pressure points between the cooperating elements causes said rollers to ride up the sloping face cams and displace the lever unit axially thereby compressing the spring which, when the rotatable elements of the transmission unit rotate to relieve the resistance, reacts through the rollers on the face cams to effect corresponding angular movement of the spindle member of the "iris" plate.

9. An infinitely variable friction drive transmission according to claim 1, wherein means is provided for positioning the control member for selecting a desired drive ratio.

10. An infinitely variable friction drive transmission according to claim 9, wherein the control member is provided with a spring-loaded catch member engaging a toothed disc or quadrant.

11. An infinitely variable friction drive transmission according to claim 10, wherein said toothed member is angularly movable or rotatable about an axis and adapted to be operated by any suitable means for automatic variation of the drive ratio.

12. An infinitely variable friction drive transmission according to claim 11, wherein means is provided for locking the toothed member against angular movement or rotation when automatic control is not required.

13. An infinitely variable friction drive transmission according to claim 1, wherein means is provided for positioning the control member for selecting a desired drive ratio and wherein releasable means is provided for locking the ratio-adjusting mechanism or operating member thereof against angular movement so that, while the rotatable elements of the transmission unit are rotating, the control member may be moved to select a predetermined drive ratio which is automatically taken up when said releasable means is disengaged.

14. An infinitely variable friction drive transmission according to claim 13, wherein said releasable means comprises a spring-loaded catch member engageable with a toothed rim on said operating member and adapted to be retained in a withdrawn position when pre-selection of ratio during operation of the drive unit is not required.

References Cited in the file of this patent

UNITED STATES PATENTS

| | | |
|---|---|---|
| 2,469,653 | Kopp | May 10, 1949 |
| 2,675,713 | Acker | Apr. 20, 1954 |